(12) United States Patent
Henriques et al.

(10) Patent No.: US 7,966,473 B2
(45) Date of Patent: Jun. 21, 2011

(54) OPTIMISED STORAGE ADDRESSING METHOD

(75) Inventors: Jean-Paul Henriques, Eybens (FR); Fabrice Devaux, Les Marches (FR)

(73) Assignees: STMicroelectronics S.A., Montrouge (FR); Infineon Technologies AG, Munich (DE)

( * ) Notice: Subject to any disclaimer, the term of this patent is extended or adjusted under 35 U.S.C. 154(b) by 1408 days.

(21) Appl. No.: 10/475,485

(22) PCT Filed: Apr. 17, 2002

(86) PCT No.: PCT/FR02/01328
§ 371 (c)(1),
(2), (4) Date: May 14, 2004

(87) PCT Pub. No.: WO02/086700
PCT Pub. Date: Oct. 31, 2002

(65) Prior Publication Data
US 2004/0199738 A1   Oct. 7, 2004

(30) Foreign Application Priority Data

Apr. 20, 2001 (FR) .................................... 01 05405

(51) Int. Cl.
*G06F 12/00* (2006.01)
*G06F 9/26* (2006.01)
*G06F 9/34* (2006.01)
*G06F 13/00* (2006.01)
*G06F 13/28* (2006.01)

(52) U.S. Cl. .. 711/213; 711/154; 711/204; 711/E12.058

(58) Field of Classification Search ................... 711/213
See application file for complete search history.

(56) References Cited

U.S. PATENT DOCUMENTS

| 4,236,205 | A | * | 11/1980 | Kindseth et al. | .............. 711/137 |
| 5,060,188 | A | * | 10/1991 | Zulian et al. | ...................... 711/5 |
| 5,611,065 | A | * | 3/1997 | Alferness et al. | ............. 711/220 |
| 5,710,914 | A | | 1/1998 | Verbauwhede et al. | |

(Continued)

OTHER PUBLICATIONS

Adi Yoaz et al. "Speculation techniques for improving load related instruction scheduling", May 1999, ACM SIGARCH Computer Architecture News, vol. 27, Issue 2, pp. 42-53.*

*Primary Examiner* — Shane M Thomas
*Assistant Examiner* — Matthew R Chrzanowski
(74) *Attorney, Agent, or Firm* — Lisa K. Jorgenson; James H. Morris; Wolf, Greenfield & Sacks, P.C.

(57) ABSTRACT

The invention concerns a method for read-addressing a site among a plurality of storage units using a coded address derived from an instruction. The method comprises the following steps: a) predicting (104) the storage unit corresponding to the site to be addressed; b) decoding (108) the address of the site to be addressed and determining (109) the storage unit to be addressed; c) managing (105) a potential read and rewrite conflict assuming that the predicted storage unit is the storage unit to be addressed; d) controlling (111) the addressing of the predicted storage unit at the end of the managing step (105); e) at the end of step b), determining (110) whether the storage unit to be addressed corresponds to the predicted storage unit; and f) if the storage unit to be addressed does not correspond to the predicted storage unit, managing (115) a possible read and rewrite conflict in the storage unit to be addressed and addressing the site of the storage unit to be addressed.

15 Claims, 4 Drawing Sheets

U.S. PATENT DOCUMENTS

| | | | |
|---|---|---|---|
| 6,101,577 A * | 8/2000 | Tran | 711/125 |
| 6,189,068 B1 * | 2/2001 | Witt et al. | 711/3 |
| 6,253,276 B1 * | 6/2001 | Jeddeloh | 711/5 |
| 6,651,162 B1 * | 11/2003 | Levitan et al. | 712/238 |
| 6,694,421 B2 * | 2/2004 | Yoaz et al. | 711/204 |
| 7,062,638 B2 * | 6/2006 | Yoaz et al. | 712/225 |
| 7,181,598 B2 * | 2/2007 | Jourdan et al. | 712/217 |
| 2002/0078332 A1 * | 6/2002 | Seznec et al. | 712/240 |
| 2003/0051099 A1 * | 3/2003 | Yoaz et al. | 711/118 |
| 2003/0182543 A1 * | 9/2003 | Keller et al. | 712/237 |

* cited by examiner

OPTIMISED STORAGE ADDRESSING METHOD

BACKGROUND OF THE INVENTION

1. Field of the Invention

The present invention relates to memory addressing and more specifically to the search in a memory of data by a computer device such as a microcontroller.

2. Discussion of the Related Art

FIG. 1 schematically shows the structure of a conventional microcontroller. Microcontroller 1 includes an FPC program controller ("Fetch and Pipeline Controller"), an address unit ADU, and an FXU unit ("FiXed point Unit").

Program controller FPC is connected to a program memory 3 external to the microcontroller via a program memory controller 5, also external to the microcontroller. Program controller FPC includes a pre-fetch unit 7 which, in a clock cycle, stores the current instruction and ensures the microcontroller sequencing. Program controller FPC also includes a fetch and decode unit 9. For each new clock cycle, the content of unit 7 is transferred to unit 9. Thus, in a cycle n, unit 9 contains the instruction of the preceding cycle, n−1, and decodes it. The decoding of the instruction of cycle n−1 enables knowing the nature of the operation to be performed, the address in coded form of the operand(s) to be used in the operation and the address in coded form of the memory location where the result of the operation is to be placed.

Address unit ADU first includes an address decoding unit 11. For each new cycle, fetch and decode unit 9 transfers its content to address decoding unit 11. Unit 11 decodes the coded addresses that it receives, that is, it determines, based on these addresses, the physical address or real address of the operands to be fetched from the memory, as well as the physical address of the location where the result of the operation is to be stored.

Address unit ADU then includes a unit 13 enabling access in read mode to the memory support containing the operands. Conventionally, microcontroller 1 includes two internal data memories, a RAM 15 accessible via a memory controller 17 and a bank of directly accessible registers 19. A portion of memory 15 is assigned to a batch addressed by a batch pointer. As soon as unit 11 has finished decoding the addresses to be used (and performing several processings which will be discussed hereafter), it transfers its content to read access unit 13. Unit 13 then reads, at the beginning of a cycle, from the appropriate memory and fetches the operands to be used. This operation, which lasts for one cycle, is symbolized by arrows 21 and 22 respectively going from controller 17 and register bank 19 to unit 13. one cycle, is symbolized by arrows 21 and 22 respectively going from controller 17 and register bank 19 to unit 13.

At the next cycle, unit 13 transfers its content into an execution unit 23, which is the only unit of unit FXU. Unit 23 performs the arithmetic or logic operations required by the instruction and provides the result of the operation. Unit 23 then transfers the result of the operation and the physical address at which the result is to be stored to a rewrite unit 25. Unit 23 can directly have access to a register of register bank 19 in the write mode, which is symbolized by arrow 24. For example, unit 23 can modify, if required, the content of a register of the bank used as an address pointer.

Rewrite unit 25 also belongs to address unit ADU. It addresses memory 15 in write mode, which is symbolized by arrow 26, to store therein the result of the operation. Unit 25 can also address a register of register bank 19, as symbolized by arrow 27, to store therein the result, if required. Unit 25 performs its task in one clock cycle.

Units 7, 9, 11, 13, 23, and 25 of the microcontroller (these units could be called "stages") form a so-called pipeline structure, that is, a structure in which the content of a unit is sequentially transferred to the next unit. The microcontroller thus contains six instructions at the same time, in various stages of processing. If each unit only used one clock cycle to perform its task, the processing of an instruction would take no longer than six cycles and the microcontroller would operate optimally.

In practice, however, a limitation comes from address unit ADU, and in particular from address decoding unit 11. Indeed, as will be seen hereafter, some addresses require a significant decoding time and unit 11 requires two clock cycles to provide the corresponding physical addresses. This results in the loss of a cycle and the microcontroller operation is not optimal.

An object of the present invention is to provide a shorter memory addressing method than in prior art.

SUMMARY OF THE INVENTION

To achieve these and other objects, the present invention provides a method for addressing in read mode a location in one of several memories by means of a coded address coming from an instruction. The method includes the steps of:
 a) predicting, among the several memories, which memory corresponds to the location to be addressed,
 b) decoding the address of the location to be addressed and determining the memory to be addressed,
 c) at the end of step a), managing a possible read and rewrite conflict, assuming that the predicted memory is the memory to be addressed,
 d) controlling the addressing of the predicted memory at the end of management step c),
 e) at the end of step b), determining whether the memory to be addressed corresponds to the predicted memory, and
 f) if the memory to be addressed does not correspond to the predicted memory, managing a possible read and rewrite conflict in the memory to be addressed and addressing the location of the memory to be addressed.

According to an embodiment of the present invention, step a) uses a table including a history of the memories addressed in preceding instructions.

According to an embodiment of the present invention, the table contains a number of registers equal to the number of pointers used to determine an address, each of said registers being assigned to a specific pointer, and each of said registers contains an information enabling determination of which memory has been addressed by said pointer upon its last use.

According to an embodiment of the present invention, decoding and determination step b) starts at the same time as prediction step a).

According to an embodiment of the present invention, in case of a read and rewrite conflict in a same memory, priority is granted to the rewriting.

According to an embodiment of the present invention, a step of examination of time constraints is carried out after the managing of the read and rewrite conflict of steps c) or f), to examine whether the reading from the memory to be read can be performed in the next clock cycle.

According to an embodiment of the present invention, the coded addresses belong to one of the following types: short address, long address, or indirect address.

According to an embodiment of the present invention, the method includes a step of address type determination and prediction step a), managing step c), addressing step d), and comparison step e) are only carried out if the coded address of the location to be addressed is an indirect address.

According to an embodiment of the present invention, the table is invalidated if the coded address of the location to be addressed is not an indirect address.

According to an embodiment of the present invention, the method is implemented by a device of microcontroller or microprocessor type, and the memories likely to be addressed are a SRAM-type memory internal to said device, a DPRAM-type memory internal to said device, and a memory external to said device.

BRIEF DESCRIPTION OF THE DRAWINGS

The foregoing objects, features and advantages of the present invention, will be discussed in detail in the following non-limiting description of specific embodiments in connection with the accompanying drawings, in which:

FIGS. 2A, 2B, 2C1 and 2C2 show address types used in the present invention;

DETAILED DESCRIPTION

Figure 1:
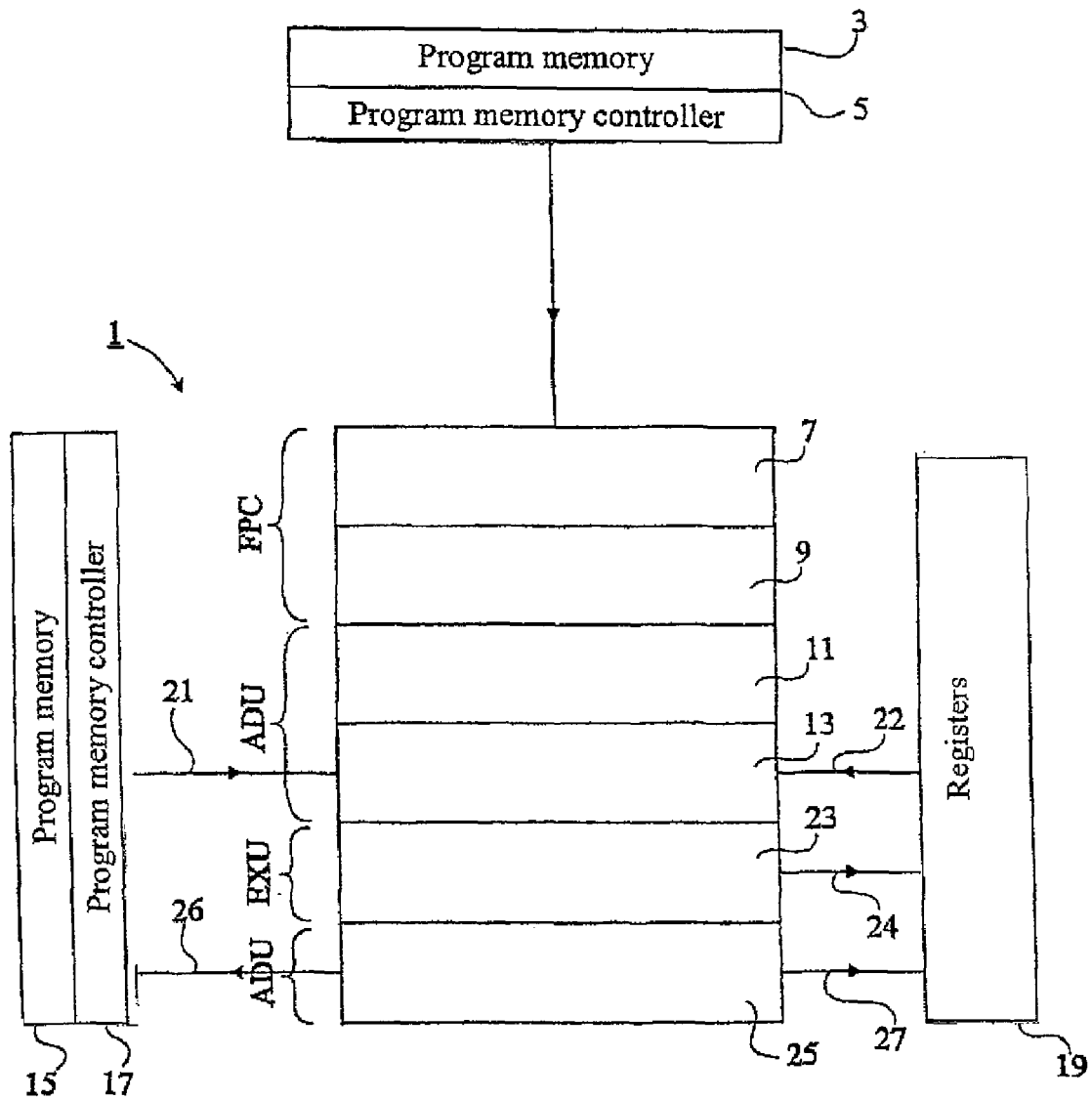
FIG. 1, previously described, schematically shows the structure of a conventional microcontroller.

The microcontroller used in the present invention has a structure generally similar to that of the microcontroller of FIG. 1, and the same references correspond to elements or elements fulfilling, at least partly, the same function. The specificities of the microcontroller of the present invention with respect to that of FIG. 1 will appear from the description, especially in the description of FIG. 5.

The physical addresses used in the present invention are 24-bit addresses. As mentioned, the instructions received by the microcontroller include no physical addresses, but shorter coded addresses enabling determination of the corresponding physical addresses.

Conventionally, in the present invention, the coded addresses are of three types.

Figure 2A:

FIG. 2A shows a physical address of "short" type. This so-called short address includes 8 bits, b0 to b7. Bits b0 to b7 correspond to the address of a specific register including 24 determined bits. The 24 bits of the register determined by the short address form a fixed base to be added to the short address to obtain the corresponding physical address.

Figure 2B:
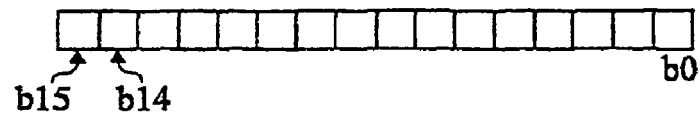
Figure 2B:
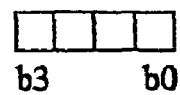
Figure 2B:
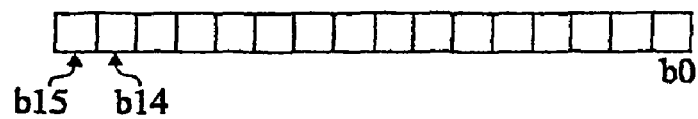

FIG. 2B shows a coded address of "long" type. This so-called long address includes 16 bits, b0 to b15. The 16 bits of the long address form the 16 least significant bits of the corresponding physical address. The 8 most significant bits of the physical address are determined based on specific bits of the long address. As a non-limiting example, in an implementation of the present invention, the two most significant bits b15, b14 of the long address are used to address one of four 8-bit programmable registers representing the 8 most significant bits of the corresponding physical address.

FIG. 2C1 shows a coded address of "indirect" type. This so-called indirect address includes a reduced number of bits representing the address of a specific register R. Register R is used as an address pointer. Its content, which is not fixed, is used to determine the desired physical address. As a non-limiting example, in an implementation of the present invention, the indirect addresses include four bits b0 to b3. These four bits enable addressing one of sixteen address pointers. As illustrated in FIG. 2C2, each address pointer is a register of 16 bits, b0 to b15. Based on the 16 bits of the address pointer, the physical address is determined in the same way as for long addresses. Due to its great flexibility and to the small number of bits that it requires, this so-called addressing mode is very widely used.

The step of decoding the coded address is carried out by unit 11. Indirect addresses are the longest to be decoded and require a duration equal to approximately one quarter of a clock cycle.

After determining the 24-bit physical address, unit 11 determines which memory support is to be addressed. In the present invention, in addition to the memories internal to the microcontroller, address unit ADU can have access to one or several memories external to the microcontroller. Further, what corresponds to RAM 15 of prior art in the present invention includes a memory of SRAM type, a memory of DPRAM type, a batch that may belong to one of the two preceding memories, and registers, like the registers enabling determination of the physical addresses by means of the coded addresses.

To determine the memory to be addressed, unit 11 examines the bits of the physical address, for example, starting with the most significant bits. Indeed, the addresses of the locations of each specific memory generally follow one another and range from a lower or minimal address to a higher or maximal address. For example, the addresses (in hexadecimal notation) ranging from 008000 to 00FBFF correspond to locations in the SRAM, the addresses ranging from 00FC00 to 00FDFF correspond to locations in the DPRAM, etc. If the address corresponds to no location in a memory internal to the microcontroller, it can be deduced that the memory to be addressed is an external memory. If there are several external memories, the above method is followed to determine which memory is involved. This step of determination of the memory to be addressed is long. It may be necessary to examine a large number of bits of the physical address, 12 for example, before knowing the memory to be addressed. The duration of this step is on the order of one quarter of a clock cycle.

Then, unit 11 manages a possible conflict between the reading from and the rewriting into a same memory support. During this step, also called the passband conflict management step, unit 11 determines whether the instruction present in unit 25 requires rewriting in the same memory as that which is to be addressed by the instruction that it contains. If it is so, priority is generally granted to the rewriting into the memory, since the corresponding instruction is older than the instruction requesting reading. This management step is generally shorter than the preceding steps, and has a duration equal to approximately 15% of a clock cycle.

After the management step, unit 11 carries out a fourth step comprising determining whether the time constraints associated with the access to the memory to be addressed are respected. Indeed, memories, in particular synchronous memories, must receive the control signals for addresses to be read in a determined time before the beginning (rising edge of the clock, for example) of the cycle in which the reading takes place. This determined time especially enables the memory to decode the provided control signals (if this is not respected, the memory has an unpredictable behavior and the read value cannot be used). This fourth step lasts for approximately 10% of a clock cycle. If time constraints are respected, unit 11 transfers its content into unit 13 which prepares the addressing and carries out the memory reading at the next cycle. If the time constraints are not respected, unit 11 transfers its content to unit 13 at the beginning of the next cycle. Unit 13 then has one cycle to prepare the addressing, and the reading is only carried out at the next cycle.

According to the type of coded address used by the instruction, the duration of the steps carried out by unit 11 is longer or shorter. In the case of short or long addresses, in prior art as in the present invention, time constraints are generally respected and the reading of the memory to be addressed can be performed at the next cycle. However, in the case of indirect addresses, time constraints are never respected in prior art and two clock cycles are required prior to the memory reading.

Figures 3, 4A, 4B:
FIG. 3 shows a timing diagram illustrating the operation of the address unit in prior art.
FIGS. 4A and 4B each show a timing diagram illustrating the operation of the address unit according to the present invention.

FIG. 3 shows three consecutive clock cycles, and the various steps carried out by the address unit in prior art, in the case of an indirect address.

During the first cycle, from 0 to 100, prior art unit 11 carries out the steps of address decoding, determination of the memory to be addressed, conflict management, and examination of time constraints. These four successive steps, noted A, B, C, D, respectively last for 25%, 25%, 15%, and 10% of the time of the first cycle. Unit 11 has ended its processing at the time noted 75, corresponding to 75% of the first cycle. There only remains 25% of the duration of a cycle to end the first cycle, and this duration is insufficient to enable preparation of the memory addressing by unit 13. Accordingly, unit 11 only transfers its content into unit 13 at the beginning of the second clock cycle, from 100 to 200. The reading from the memory then only starts at the beginning of the third cycle, from 200 to 300, and the searched operand is available at time 300.

It can be seen that, in prior art, the reading requires three clock cycles in the case of an indirect address, and that the second cycle is very underused. Actually, in some microcontrollers of prior art, steps C and D are directly carried out at the beginning of the second cycle in the case of indirect addresses.

The present invention will now be described in relation with FIGS. 4A and 4B, which illustrate the processing, according to the present invention, of the same case as that considered in FIG. 3. As shown in FIG. 4A, unit 11 of the present invention carries out address decoding step A and step B of determination of the memory to be addressed. As in FIG. 3, these steps have a total duration equal to 50% of the duration of the first cycle, from 0 to 100.

At the same time as step A, unit 11 carries out a prediction step A'. This prediction step comprises predicting which memory is to be addressed. Step A', shown in FIG. 4B, starts at the beginning of the first cycle and has an approximate duration equal to 20% of the first cycle. The predicted memory is assumed to be the memory to be addressed. To determine the predicted memory, several more or less complex tables containing the history of the preceding instructions, or at least the history of the previously addressed memories, are used to make forecasts about the memory to be addressed for the current instruction. The memory which has been addressed in the preceding instruction may also simply be used as a predicted memory. For the first instruction of a program, any memory may be chosen as the predicted memory.

After step A', unit 11 carries out a conflict management step C' (FIG. 4B). During this step, it is examined whether the predicted memory corresponds to the memory waiting to be rewritten into by unit 25. First assume that such is not the case. After management step C', unit 11 carries out an examination step D' (still in FIG. 4B) to known whether the time constraints are respected. Steps C' and D' respectively last for 15% and 10% of the duration of a cycle and steps A', C', and D' altogether have a duration equal to approximately 45% of the first cycle. It should be noted that, in this context, the result of step D' always is that the time constraints have been respected and that this step could be suppressed.

At the end of step B, the memory to be addressed is known. Unit 11 then carries out a step E (FIG. 4A) for determining whether the predicted memory corresponds to the memory to be addressed. This step lasts for approximately 10% of the time of a cycle.

If the prediction is good, that is, if the predicted memory effectively corresponds to the memory to be addressed, the entire processing carried out by unit 11 in the present invention has a total duration equal to 60% of the first cycle. The remaining duration of the first cycle (40% of the cycle) is then sufficient for unit 11 to present the addressing request to unit 13 during the first cycle. Unit 13 prepares the addressing of the memory to be addressed during the first cycle and the reading occurs in the second clock cycle, from 100 to 200. As compared to prior art, the present invention enables gaining one clock cycle. There is no "slack period" in the instruction processing and the microcontroller operation is optimized.

If the predicted memory does not correspond to the memory to be addressed, which is known at the end of step E, unit 11 carries out, at the end of step E or at the beginning of the second cycle, a new conflict management step. During this step, unit 11 examines whether the memory to be addressed corresponds to the memory waiting to be rewritten into by unit 25. If such is not the case, unit 11 carries out a new optional step of examination of time constraints, which are always respected in this case. It has the addressing of the memory to be addressed prepared by unit 13. These steps take place in the second cycle and the memory reading occurs during the third cycle. The duration required to process the instruction in this case is identical to that of prior art.

In programs used by microcontrollers, a large number of consecutive instructions often concern the addressing of a same memory support. Thus, in a program, the same address pointer is often assigned to the same memory support. The prediction of the memory to be addressed according to a history of the previously addressed memories has high chances of success and the time gain provided by the present invention is considerable.

In the present invention as in prior art, in case of a conflict between a reading from and a rewriting into the memory to be addressed, priority is generally granted to the rewriting.

Figure 5:
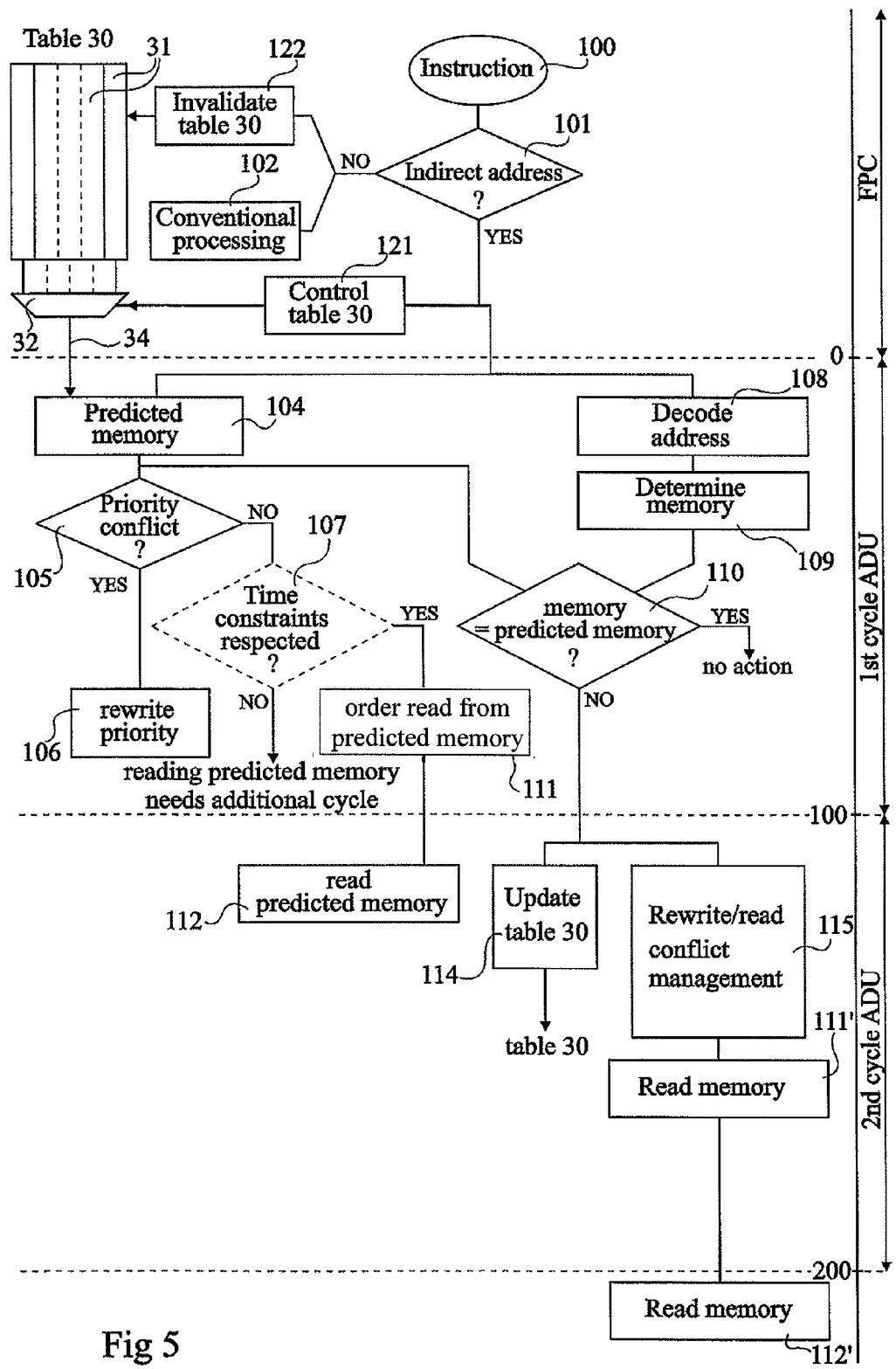
FIG. 5 schematically shows a flowchart summing up the implementation of the present invention.

FIG. 5 shows a flowchart summing up the implementation of the present invention and enabling more detailed discussion of the way in which the prediction can be carried out.

First, at the level of the FPC program controller, it is examined (step 101) whether instruction 100 concerns at least one indirect address. If not (no required address or only short or long addresses), the instruction processing is performed conventionally (step 102), that is, the address decoding, the determination of the memory to be addressed, the management of possible conflicts, the examination of time constraints, and the transmission to unit 13 are normally performed by unit 11 in a single cycle.

If the address is an indirect address, unit 11 starts, at time 0 (beginning of the first cycle where address unit ADU starts processing the instruction), two simultaneous processings. On the one hand, it determines the predicted memory (step 104), by means of an information that it receives from a table 30. Then, unit 11 manages a possible priority conflict involving the predicted memory (step 105). As said, if there is a conflict, the rewriting will be performed with priority over the reading (block 106). If there is no conflict, unit 11 examines at 107, optionally, as seen, whether the time constraints are respected, after which it orders (step 111) the reading from the predicted memory by means of the calculated address, as will be seen hereafter, during a step 108 of decoding of the coded address. The reading from the predicted memory is performed during the second cycle (block 112).

On the other hand, at time 0, unit 11 starts the decoding (calculation) of the indirect address (step 108). Then, it determines the memory to be effectively addressed (step 109). After this, it determines at 110 whether the predicted memory effectively corresponds to the memory to be addressed. If it is so, no action is taken.

If the predicted memory does not correspond to the memory to be addressed, the data read from the predicted memory will not be taken into account. Unit 11, on the one hand, updates table 30 (step 114) and, on the other hand, carries out a new rewrite/read conflict management step, this time as concerns the memory to be addressed (step 115). This conflict management is preferably performed by the same hardware elements as those which are used to manage the conflicts of the predicted memory. The updating of the table and the management of the conflicts involving the memory to be addressed can be performed as soon as the predicted memory is known not to be the memory to be addressed, or at the beginning of the second cycle, as shown. In case of a conflict, priority is granted to the rewriting. If there is no conflict, the time constraints are examined (step 115), optionally since these constraints are always respected in this case. The order for reading from the memory to be addressed occurs at step 111' and the reading from the memory to be addressed occurs during the third cycle (step 112').

The content of table 30 and the way in which it is used will now more precisely be described. It has been seen that, in the present invention, there are sixteen address pointers and one batch pointer. Table 30 contains seventeen registers 31, corresponding to each of the seventeen pointers used. Each of registers 31 encloses an information indication the memory which has been addressed by the concerned pointer for the last time when this pointer has been used in an instruction. Registers 31 may be three-bit registers, which is enough to enable discrimination of eight memories. If the only memories addressed by the pointers are a SRAM, a DPRAM, and a single external memory, two bits only may be used for registers 31 or three bits may be used with a simple coding, for example, bits "001" corresponding to the SRAM, bits "010" corresponding to the DPRAM, and bits "100" corresponding to the external memory.

When an indirect address is detected at the level of the FPC controller, this address is examined at the level of a block 121 to determine the pointer to be used to decode the coded address. This information is used to control a multiplexer 32 associated with table 30. Multiplexer 32 has seventeen inputs, each of which is connected to one of registers 31. The control of multiplexer 32 comprises selecting the register corresponding to the pointer used in the instruction. Multiplexer 32 then provides, on its output 34, an information corresponding to the memory which has been addressed by this pointer in its last use. This information is provided to unit 11. Unit 11 decodes this information during step 104 and chooses as a predicted memory the memory previously addressed by the used pointer.

In case the prediction is not successful, an updating of table 30 is necessary and is performed as follows. The code corresponding to the memory to be addressed is determined (for example, "001" for the SRAM in the example given hereabove) and it is stored in register 31 corresponding to the involved pointer, at the location of the old code.

At the beginning of each new program, all registers in table 30 may be filled with a same code, for example, that corresponding to the SRAM.

In an alternative of the present invention, table 30 is invalidated (block 122) when the current instruction uses no indirect address. The invalidation of table 30 may be performed at the level of table 30 itself or at the level of multiplexer 32. When table 30 is invalidated, output 34 of the multiplexer provides no information and prediction step A' does not take place. It may also for example be provided, when table 30 is invalidated, for the output of multiplexer 32 to provide a code corresponding to no memory support.

The present invention is likely to have various alterations, modifications, and improvements which will readily occur to those skilled in the art. In particular, the device implementing the present invention may be a microcontroller, a microprocessor, or any other appropriate device.

The structure of the physical addresses, the way in which is coded, in a physical address, the memory to be addressed, the number of pointers used, the number of registers, and the number of addressable memories are given as an example only, and those skilled in the art are capable of modifying these elements in the context of the present invention.

Table 30 may contain a different history from that which has been described as an example. For example, to predict the memory to be addressed, the memories addressed by the last three uses of the pointer involved in the current instruction may be considered, and the memory which has been most often addressed by this pointer may be chosen. One may also, to predict the memory to be addressed, take into account not only the memory or memories addressed by the involved pointer, but also the memory addressed in the preceding instruction, even if this instruction does not concern the same pointer.

The present invention may be implemented by any appropriate hardware means, the described hardware means having only been described as an example.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not as limiting. The invention is limited only as defined in the following claims and the equivalents thereto.

What is claimed is:

1. A method for addressing in read mode a location in one of several memories by means of a coded address coming from an a first instruction, comprising:
   a) predicting, among the several memories, which memory corresponds to the location to be addressed,
   b) decoding the address of the location to be addressed and determining the memory to be addressed,
   c) at the end of step a), using a predicted memory obtained in step a) to determine whether a predicted read access conflicts with a known rewrite access, at least in part by determining whether the known rewrite access is directed to the predicted memory,
   d) controlling the addressing of the predicted memory at the end of management step c),
   e) at the end of step b), determining whether the memory to be addressed corresponds to the predicted memory,
   f) if the memory to be addressed does not correspond to the predicted memory, managing a possible read and rewrite conflict in the memory to be addressed and addressing the location of the memory to be addressed, and g) providing, during a same clock cycle as the act of decoding the address, a control signal to the predicted memory to prepare for a predicted read access directed to the predicted memory.

2. The method of claim 1, wherein step a) uses a table including a history of the memories addressed in preceding instructions.

3. The method of claim 2, wherein the table contains a number of registers equal to a number of pointers used to determine an address, each of said registers being assigned to a specific pointer, and wherein each of said registers contains an information enabling determination of which memory has been addressed by said pointer upon its last use.

4. The method of claim 1, wherein decoding and determination step b) starts at the same time as prediction step a).

5. The method of claim 1, wherein, in case of a read and rewrite conflict in a same memory, priority is granted to the rewriting.

6. The method of claim 1, wherein a step of examination of time constraints is carried out after the managing of the read and rewrite conflict of steps c) or f), to examine whether the reading from the memory to be read can be performed in the next clock cycle.

7. The method of claim 1, wherein the coded addresses belong to one of the following types: short address, long address, or indirect address.

8. The method of claim 7, including a step of address type determination and wherein prediction step a), managing step c), addressing step d), and comparison step e) are only carried out if the coded address of the location to be addressed is an indirect address.

9. The method of claim 2, including a history of the memories addressed in preceding instructions, wherein the table is invalidated if the coded address of the location to be addressed is not an indirect address.

10. The method of claim 1, implemented by a device of microcontroller or microprocessor type, and the memories likely to be addressed are a SRAM-type memory internal to said device, a DPRAM-type memory internal to said device, and a memory external to said device.

11. A method for executing a plurality of instructions comprising a first instruction and a second instruction, the method comprising acts of:
  decoding a first coded address associated with the first instruction to obtain a first decoded address;
  determining, prior to the first decoded address being available, a predicted memory for the first instruction, the predicted memory being one of the plurality of memories;
  determining whether a predicted access associated with the first instruction conflicts with an access associated with the second instruction, at least in part by determining whether the access associated with the second instruction is directed to the predicted memory; and
  providing, during a same clock cycle as the act of decoding the first coded address, a control signal to the predicted memory to prepare for the predicted access associated with the first instruction.

12. The method of claim 11, further comprising:
  decoding a second coded address associated with the second instruction to obtain the second decoded address, wherein determining whether the access associated with the second instruction is directed to the predicted memory comprises determining whether the second decoded address specifies the predicted memory.

13. The method of claim 11, where the predicted access is a read access and the access associated with the second instruction is a write access.

14. A method for executing a plurality of instructions comprising a first instruction, the method comprising acts of:
  decoding a first coded address associated with the first instruction to obtain a first decoded address;
  determining a predicted memory for the first instruction, the predicted memory being one of the plurality of memories;
  prior to the first decoded address being available, using the predicted memory to predict whether a priority conflict exists; and
  providing, during a same clock cycle as the act of decoding the first coded address, a control signal to the predicted memory to prepare for a predicted access associated with the first instruction;
  wherein the plurality of instructions further comprises a second instruction, and wherein the act of using the predicted memory to predict whether a priority conflict exists comprises:
  determining, prior to the first decoded address being available, whether the predicted access associated with the first instruction conflicts with an access associated with the second instruction, at least in part by determining whether the access associated with the second instruction is directed to the predicted memory.

15. The method of claim 14, further comprising:
  determining, when the first decoded address becomes available, whether the predicted memory coincides with a memory to be addressed as indicated by the first decoded address.

* * * * *